United States Patent [19]

Guginsky

[11] Patent Number: 4,835,342

[45] Date of Patent: May 30, 1989

[54] STRAIN RELIEF LIQUID TIGHT ELECTRICAL CONNECTOR

[75] Inventor: Frank Guginsky, Commack, N.Y.

[73] Assignee: Berger Industries, Inc., Maspeth, N.Y.

[21] Appl. No.: 211,900

[22] Filed: Jun. 27, 1988

[51] Int. Cl.⁴ ............................................. H02G 3/22
[52] U.S. Cl. ................................ 174/65 SS; 285/161; 285/343
[58] Field of Search ................... 174/65 SS; 285/158, 285/161, 343

[56] References Cited

U.S. PATENT DOCUMENTS 4,549,038 10/1985 Masheris ...................... 174/65 SS Primary Examiner—A. T. Grimley
Assistant Examiner—David A. Tone
Attorney, Agent, or Firm—Howard C. Miskin

[57] ABSTRACT

A strain relief electrical cable fitting includes an externally threaded tubular body member divided by an inside inclined shoulder and outside flange into an upper compression chamber and a lower coupling section, a gland cap with a central top opening engaging the body member top thread. Housed in the compression chamber is an assembly of a rubber packing member and a nylon grip member, the packing member including an upper axially bored cylindrical section and peripherally spaced longitudinal fingers and the grip member including an upper ring encircling the packing fingers and abutting the cylindrical section underface and longitudinal fingers interdigitating the packing fingers and terminating in follower sections engaging the shoulder so that tightening of the cap compresses the packing member by way of a washer to advance and contract the grip fingers to clamp a fitting engaged cable and to contract the packing section bore and effect a hermetic seal of the cable.

15 Claims, 3 Drawing Sheets

U.S. Patent    May 30, 1989    4,835,342
FIG. 1
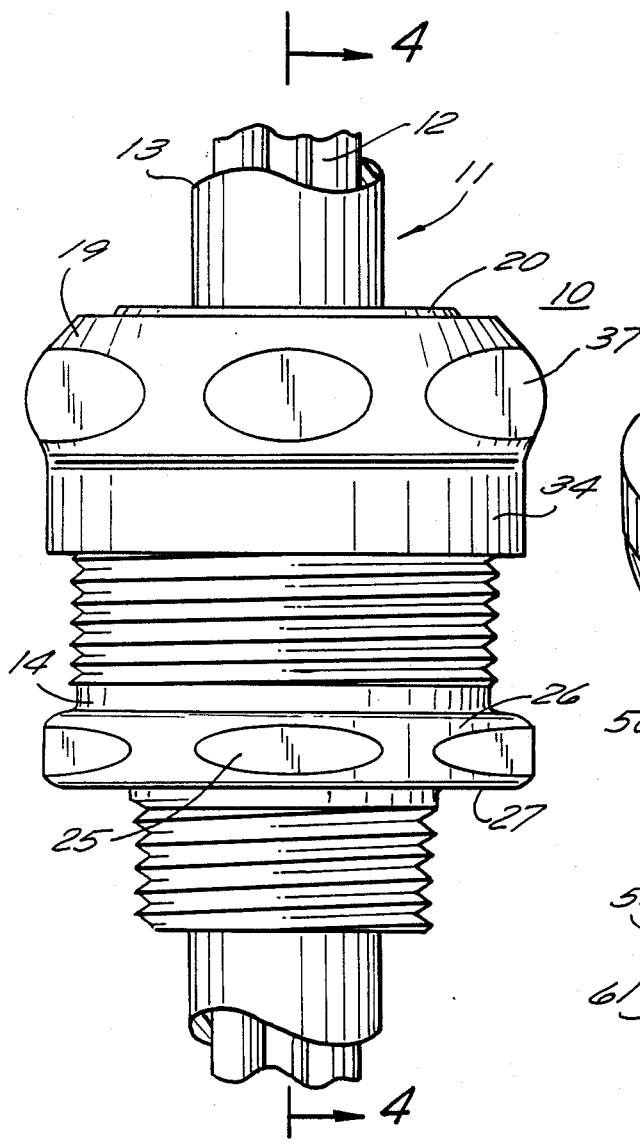
FIG. 2
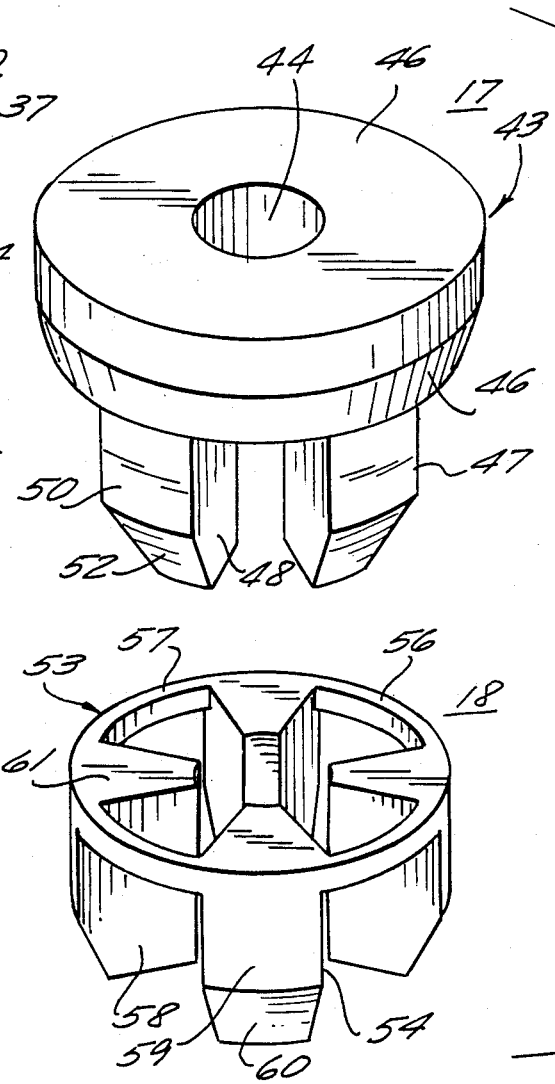
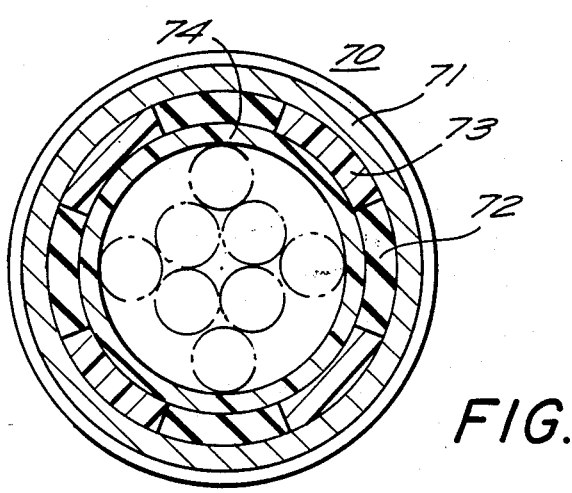
FIG. 7

STRAIN RELIEF LIQUID TIGHT ELECTRICAL CONNECTOR

BACKGROUND OF THE INVENTION

The present invention relates generally to improvements in electrical cord and cable fittings and it relates particularly to an improved device for hermetically sealing and anchoring a cable to a wall or partition through which the cable passes to relieve the strain on the leading end of the cable.

It is a common practice to pass an electrical cord or cable through a wall or partition and connect the cable conductors to one or more terminals. The wall or partition may be a wall of a junction, switch or terminal box or the like and it is important that any strain on the cable be prevented from being transmitted to the terminals to which the cable conductors are connected to thereby maintain a reliable connection to the terminals. It is additionally desirable that the cable be hermetically sealed to the wall through which it passes to prevent the exposure of the conductors and terminals to moisture and corrosive ambient atmospheres. Many devices have been available and heretofor proposed for anchoring and sealing a cable to a wall of a junction terminal or switch box or the like but these have possessed numerous draw backs and disadvantages. They have been complex and often unreliable devices, of little versatility and adaptability, expensive and have otherwise left much to be desired.

SUMMARY OF THE INVENTION

It is a principle object of the present invention to provide an improved electrical fitting.

Another object of the present invention is to provide an improved electrical fitting for preventing the transmission of stress or strain along any electrical cable.

Still another object of the present invention is to provide an improved electrical cable strain relief device which hermetically seals the cable in a selected area.

A further object of the present invention is to provide an improved fluid tight strain relief coupling allowing the passage of an electrical cable through a wall or partition.

Still a further object of the present invention is to provide a device of the above nature characterized by it's high efficiency and reliability, ease of application, ruggedness, simplicity, low cost and great versatility and adaptability.

The above and other objects of the present invention will become apparent from a reading of the following description taken in conjunction with the accompanying drawings, which illustrate preferred embodiments thereof.

An electrical fitting in accordance with the present invention comprises a tubular body member having an inside abutment below its bottom and a centrally apertured gland cap in thread engagement with the body member upper part to delineate with the body member wall and abutment a compression chamber, a preferrably elastameric packing member located in the compression chamber and including an axially bored cylindrical upper section and longitudinally depending peripherally spaced fingers and a grip member including an upper ring encircling the packing member and grip fingers depending from the ring and interdigitating the packing fingers and having top faces underlying the underface of the packing member upper section, the grip fingers and body member being so related whereby tightening of the gland cap longitudinally contracts the compression chamber to contract the packing member axial bore and depress the grip member to contract the lower portions of the grip fingers.

In the preferred form of the improved fitting the body member includes a lower coaxial section of reduced diameter delineated from the upper section by a peripheral shoulder having a cam defining inwardly downwardly inclined top face defining the chamber bottom abutment, the top and bottom body member sections being externally threaded. The gland cap has a stop wall defining peripheral flange which bears on the packing member top face through a low friction washer. The packing member fingers and grip fingers have radially extending side faces and coaxial cylindrical inner and outer faces, the side faces of adjacent fingers being contiguous and the finger inside face delineating a passageway coaxially extending from the packing member bore.

The fitting may be easily and rapidly applied and effects a tight slip-proof grip and a hermetic seal with the wall of a cable or conduit traversing the fitting which are efficient and reliable and the fitting is highly versatile, adaptable, rugged and inexpensive.

BRIEF DESCRIPTION OF THE DRAWINGS

FIG. 1 is a front elevational view of an electrical fitting embodying the present invention shown in assembled and cable applied position;

FIG. 2 is an exploded perspective view of the core assembly thereof;

FIG. 7 is a view similar to FIG. 6 of another embodiment of the present invention.

DESCRIPTION OF THE PREFERRED EMBODIMENTS

Figure 4:
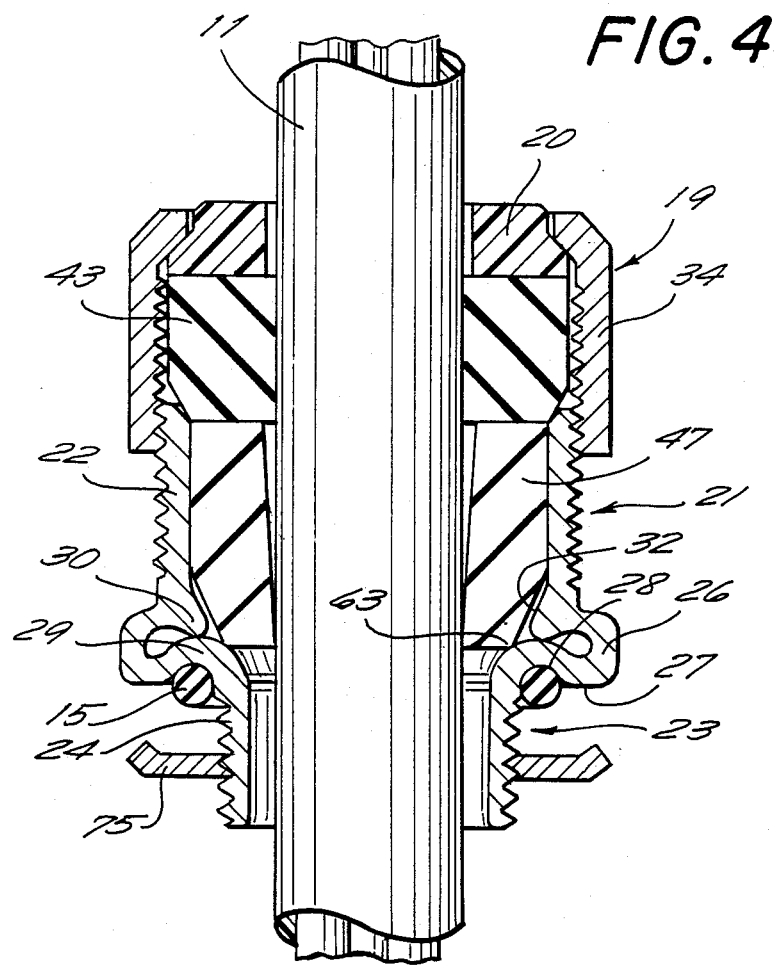
FIG. 4 is a sectional view taken along lines 4—4 in FIGS. 1 and 6.
Figure 3:
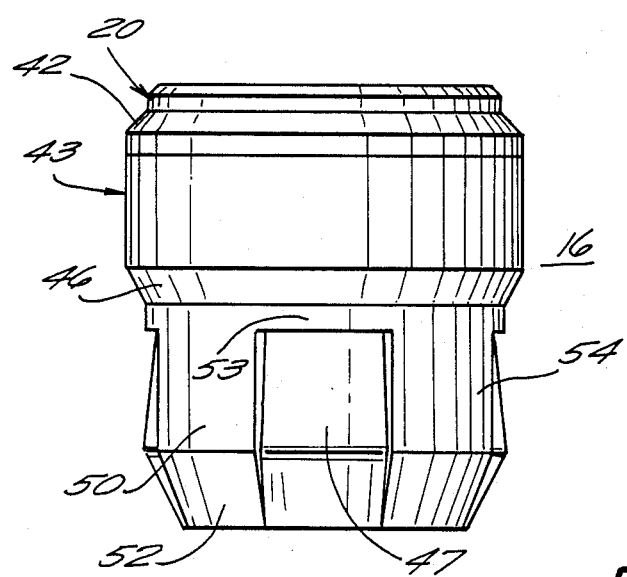
FIG. 3 is a front elevational view of the core assembly.
Figure 5:
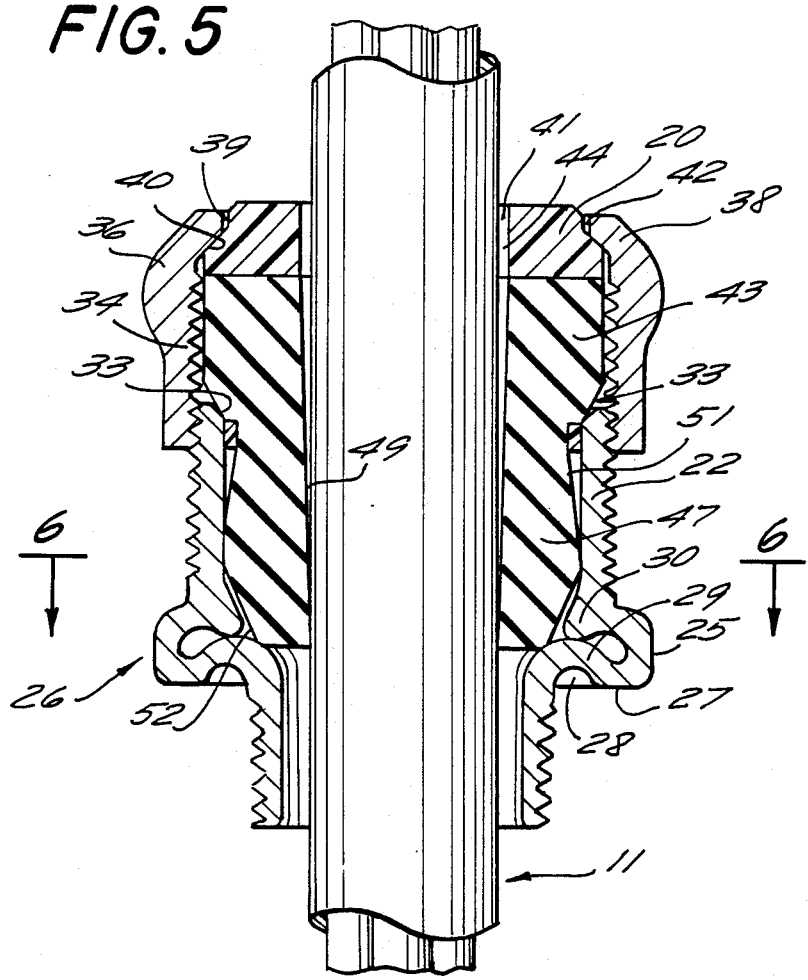
FIG. 5 is a sectional view taken along line 5—5 in FIG. 6.
Figure 6:
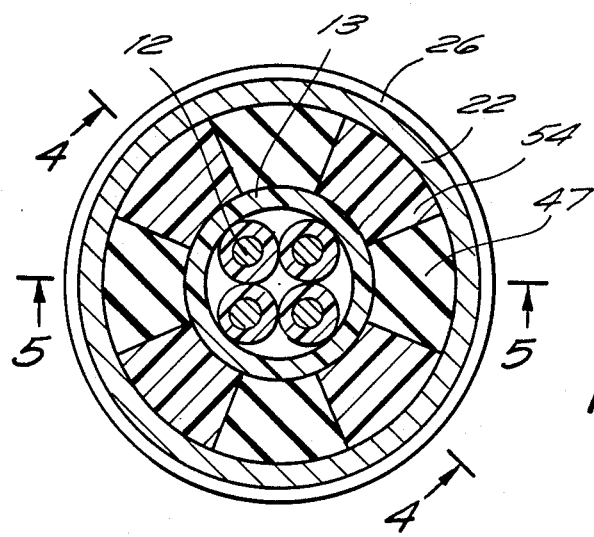
FIG. 6 is a sectional view taken along line 6—6 in FIG. 5.

Referring now to the drawings, particularly FIGS. 1 to 6 thereof which illustrate a preferred embodiment of the present invention. The reference numeral 10 generally designates the improved strain relief electrical fitting shown applied to a conventional cable 11 which includes a plurality of insulation covered conductors 12 enclosed in a waterproof plastic sheath 13, it being understood that the fitting 10 is applicable to various cable constructions. The fitting 10 comprises a rigid tubular housing 14, a sealing and grip core assembly 16 including a packing member 17 and a grip member 18, a gland cap 19 and a low friction washer 20.

The housing 14 is formed of metal or other suitable material and includes an upper large diameter section 21 defined by an externally threaded cylindrical wall 22 and a small diameter lower section 23 defined by an externally threaded cylindrical wall 24 coaxial with wall 22 and joined thereto by an outwardly directed hollow peripheral flange 26. Flange 26 is integrally formed with walls 21 and 24 and has a flat outer underface 27 spaced from wall 24 by a peripheral groove 28 and peripherally spaced outside flats 25 for the reception of a wrench. Wall 24 terminates at its top in an outwardly directed upwardly convex peripheral shoulder 29 and wall 22 has formed at its bottom an inwardly downwardly inclined lip 30 extending to shoulder 29 the inside faces of shoulder 29 and lip 30 defining a cam face 32. The top inner edge of wall 22 is bevelled as at 33.

The gland cap 19 is likewise formed of metal and includes an internally threaded peripheral skirt wall 34 in threaded engagement with threaded wall 22 and an enlarged head 36 having peripherally spaced flats 37. Head 36 terminates at its top in an inwardly projecting peripheral shoulder 38 delineating a large central circular opening 39 and having an upwardly inwardly inclined peripheral underface 40.

The washer 20 is a thick annulus formed of nylon or other low friction material and is housed in the upper part of gland cap 19 and has a central guide opening 41. The upper part of washer 20 is of reduced diameter and projects through cap opening 39 and is delineated from the lower part of washer 20 by a downwardly outwardly inclined shoulder 42 which is in sliding mating engagement with cap underface 40.

The assembly 16 is housed in the compression chamber delineated by the washer 20 and shoulder 29. Packing member 17 is formed of neoprene or other elastomeric material and includes an upper main body section 43 of cylindrical configuration with a central axial bore 44 of the diameter of opening 41 and being slightly downwardly tapered. Packing main body 43 is of a diameter about that of the inside of cap wall 34 and has a flat or convex top face 46 in mating sliding engagement with the underface of washer 20. The bottom outer peripheral edge of packing main body section 43 is inwardly downwardly tapered as at 46 and bears on the bevelled edge 23 of chamber wall 22.

A plurality, for example four, regularly peripherally spaced fingers 47 are integrally formed with packing body section 43 and depend longitudinally therefrom shortly inwardly from its bottom outer peripheral edge. Each finger 47 includes opposite side faces 48 lying in planes radial to the axis of packing body section 43 and approximately cylindrical inner and outer faces 49 and 50 respectively, the outer face 49 being coplanar with the face of bore 44 and the upperpart 51 of outside face 50 being slightly downwardly outwardly inclined, the bottom outer face 52 of each finger being downwardly inwardly inclined. The bottom outer edges of fingers 47 bear on the curved inside face of shoulder 29.

The grip member 18 is formed of nylon or other suitable resilient material and includes an upper ring 53 and a plurality, equal in number to fingers 47, and grip fingers 54 longitudinally depending from and integrally formed with ring 53. In the assembled condition of the packing and grip members the ring 53 encircles the upper parts of fingers 47 with the top flat face 56 thereof abutting the underface of packing section 43, the peripheral face of ring 53 being radially inwardly of the bottom outer edge of the packing section underface.

Grip fingers 54 interdigitate with packing fingers 47 and their inside faces delineate an axial bore. Grip fingers 54 includes radially extending side faces 58 confronting proximate side faces 48 of adjacent fingers 47, outside cylindrical faces 59 having tapered bottom outer borders 60, the faces 59 being substantially coaxial and coplanar with the corresponding outer faces of packing fingers 47. The top faces 61 of fingers 54 are flat and coplanar with ring top face 57 and abut the underface of packing member section 43. The bottom faces of fingers 54 are flat and coplanar with the flat underfaces of fingers 47. The bottom outer edges 63 of grip fingers define followers which bear on the cam defining top inner faces of shoulder 29.

In the application of the improved fitting 10 to a cable 11 the cable is inserted through the fitting by way of the longitudinal passageway defined by the openings and bores in washer 20 and assembly 16 with gland cap 19 in loose condition on body member 14. The gland cap 19 is then tightened to advance washer 20 and assembly 16 downwardly, rotation of the cap being facilitated by the slipping along the washer faces. With the advance of assembly 16 the packing finger and grip finger bottom cam follower defining edges follow the cam defining face of shoulder 29 to urge the bottom face ends of grip fingers 54 inwardly to press the inside bottom edges of grip fingers 54 into tight clamping engagement with cable 11 preventing axial movement, or stress and strain transmission by the cable and preventing further advance of the assembly 16. With further tightening of gland cap 19 elastomeric packing section 43 is longitudinally compressed to contract the bore 44 into tight hermetically sealing engagement with cable 11 and to tightly press together packing section tapered face 46 and body member wall bevelled edge 33 to contract the lower part of packing section 43 and effect a seal between face 46 and edge 33. The threaded lower section 23 permits the coupling and liquid tight sealing of fitting 10 to an apertured wall or panel, not shown, by means of a suitable rubber washer or O-ring 15 and a lock nut 75.

The embodiment of the present invention illustrated in FIG. 7 of the drawings differs from that above described only in the configuration and dimensions of the packing member fingers and the grip member and in all other respects is similar to the first described embodiment. Specifically the modified fitting 70 includes a body member 71, a gland cap and a larger opening washer similar to those earlier described and a core assembly comprising a packing member including a main section and depending spaced fingers 72 and a grip member including depending grip fingers 73 joined at their top by a connecting ring and interdigitating fingers 72. The fingers 72 and 73 differ from fingers 47 and 54 primarily in that they are of reduced radial dimensions and in that the packing section bore is of increased diameter permitting the application of the fitting 70 to a larger diameter cable with the use of the same main body member.

While these have been described and illustrated preferred embodiments of the present invention it is apparent that numerous alterations, omissions and additions may be made without departing from the spirit thereof

I claim:

1. A strain relief electrical fitting comprising:
   a tubular body member having an inwardly projecting abutment below the top thereof;
   a gland cap having a central opening in threaded engagement with the upper part of said body member and delineating with said abutment and the inside face of said body member a compression chamber;
   a compressible packing member located in said compression chamber and including a cylindrical upper section with an axial bore and peripherally spaced first fingers longitudinally depending from said upper section;

a grip member located in said compression chamber and including an upper ring encircling said packing member and peripherally spaced grip second fingers depending from said ring and interdigitating said first fingers and having top faces underlying the bottom face of said packing member upper section and cooperating with said body member and packing member whereby longitudinal contraction of said compression chamber by said gland cap compresses said packing member upper section to radially contract said axial bore and depress said grip member to contract the lower ends of said grip fingers.

2. The electrical fitting of claim 1 wherein said packing member is formed of an elastomeric material.

3. The electrical fitting of claim 2 wherein the lower outer peripheral face of said packing member upper section is downwardly radially inwardly tapered and bears on the upper peripheral edge of said body member.

4. The fitting of claim 1 wherein said grip member ring encircles and engages the upper faces of said packing member fingers and abuts the underface of the packing member upper section.

5. The electrical fitting of claim 1 wherein each of said first and second grip fingers has radially inwardly converging side faces, the faces adjacent fingers being contiguous.

6. The electrical fitting of claim 5 wherein each said finger has cylindrical inner and outer faces coaxial with said packing member base.

7. The electrical fitting of claim 1 wherein said grip finger top faces project radially inwardly from said grip member ring.

8. The electrical fitting of claim 1 wherein said grip member is integrally formed of a resilient material.

9. The electrical fitting of claim 1 wherein said body member includes a lower section below said abutment and of lesser diameter than said compression chamber and delineated therefrom by a peripheral shoulder defining said abutment.

10. The fitting of claim 9 wherein the upper inside face of said peripheral shoulder is downwardly radially inwardly inclined to define a cam face, the bottom outside edges of said grip fingers engaging said cam face.

11. The electrical fitting of claim 9 wherein the upper outer face of said body member and the inside peripheral face of said gland cap are in threaded engagement.

12. The electrical fitting of claim 1 including a low friction washer embraced between the top face of said packing member and the underface of said gland nut top wall.

13. The electrical fitting of claim 9 wherein said body member lower section is externally threaded.

14. A core assembly for a strain relief electrical fitting comprising:
an elastomeric packing member including a cylindrical upper section having an axial bore and peripherally spaced longitudinally extending first fingers integrally formed with and depending from said upper section and
a resilient grip member including an upper ring encircling and engaging the upper parts of said first fingers and grip fingers integrally formed with and depending from said ring and interdigitating said first fingers and having top faces projecting inwardly from said ring and contiguous with the underface of said packing member upper section.

15. The core assembly of claim 14 wherein said fingers have inwardly radially extending contigious side faces and coaxial inner and outer faces.

* * * * *